(12) United States Patent
Fenske

(10) Patent No.: US 12,687,618 B2
(45) Date of Patent: Jul. 21, 2026

(54) 1D CONTROL OF A PHASE LIGHT MODULATOR

(71) Applicant: TEXAS INSTRUMENTS INCORPORATED, Dallas, TX (US)

(72) Inventor: John Peter Fenske, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1121 days.

(21) Appl. No.: 17/556,482

(22) Filed: Dec. 20, 2021

(65) Prior Publication Data

US 2023/0194673 A1     Jun. 22, 2023

(51) Int. Cl.
| | |
|---|---|
| *G01S 7/481* | (2006.01) |
| *G01S 17/931* | (2020.01) |
| *G02B 26/08* | (2006.01) |
| *G02B 26/10* | (2006.01) |

(52) U.S. Cl.
CPC .......... *G01S 7/4817* (2013.01); *G01S 7/4814* (2013.01); *G01S 17/931* (2020.01); *G02B 26/0833* (2013.01); *G02B 26/101* (2013.01)

(58) Field of Classification Search
CPC .... G01S 7/4817; G01S 7/4814; G01S 17/931; G01S 17/42; G02B 26/0833; G02B 26/101

USPC ......................................................... 359/318
See application file for complete search history.

(56) References Cited

U.S. PATENT DOCUMENTS

| | | | | |
|---|---|---|---|---|
| 7,372,620 | B2* | 5/2008 | Esashi ................ | G02B 26/0841 |
| | | | | 359/298 |
| 11,693,096 | B2 | 7/2023 | Bartlett et al. | |
| 2009/0243975 | A1* | 10/2009 | Pakhchyan ............ | G09G 3/346 |
| | | | | 345/60 |
| 2010/0046062 | A1* | 2/2010 | Maeda ................. | H04N 5/7458 |
| | | | | 359/291 |
| 2019/0212545 | A1* | 7/2019 | Gong ..................... | G02B 6/356 |
| 2020/0256960 | A1* | 8/2020 | LaChapelle .......... | G01S 7/4863 |
| 2020/0257106 | A1* | 8/2020 | Hu ............................ | B81B 7/02 |
| 2021/0173239 | A1* | 6/2021 | Park ....................... | G02B 26/10 |

FOREIGN PATENT DOCUMENTS

| | | | | |
|---|---|---|---|---|
| CN | 101393105 A | * | 3/2009 | ......... G02B 21/0028 |
| WO | WO-2007045883 A1 | * | 4/2007 | ......... H04B 10/2587 |

* cited by examiner

*Primary Examiner* — William R Alexander
*Assistant Examiner* — Alaina Marie Swanson
(74) *Attorney, Agent, or Firm* — Michael T. Gabrik; Frank D. Cimino

(57) ABSTRACT

An apparatus includes micromirrors in rows and columns of a two-dimensional (2D) array, electrode lines coupled to the micromirrors, where the electrode lines are coupled to respective sets of the micromirrors, and signal driving circuits coupled to the electrode lines, the signal driving circuits configured to control the respective sets of the micromirrors via respective electrode lines.

20 Claims, 9 Drawing Sheets

100

200

1100

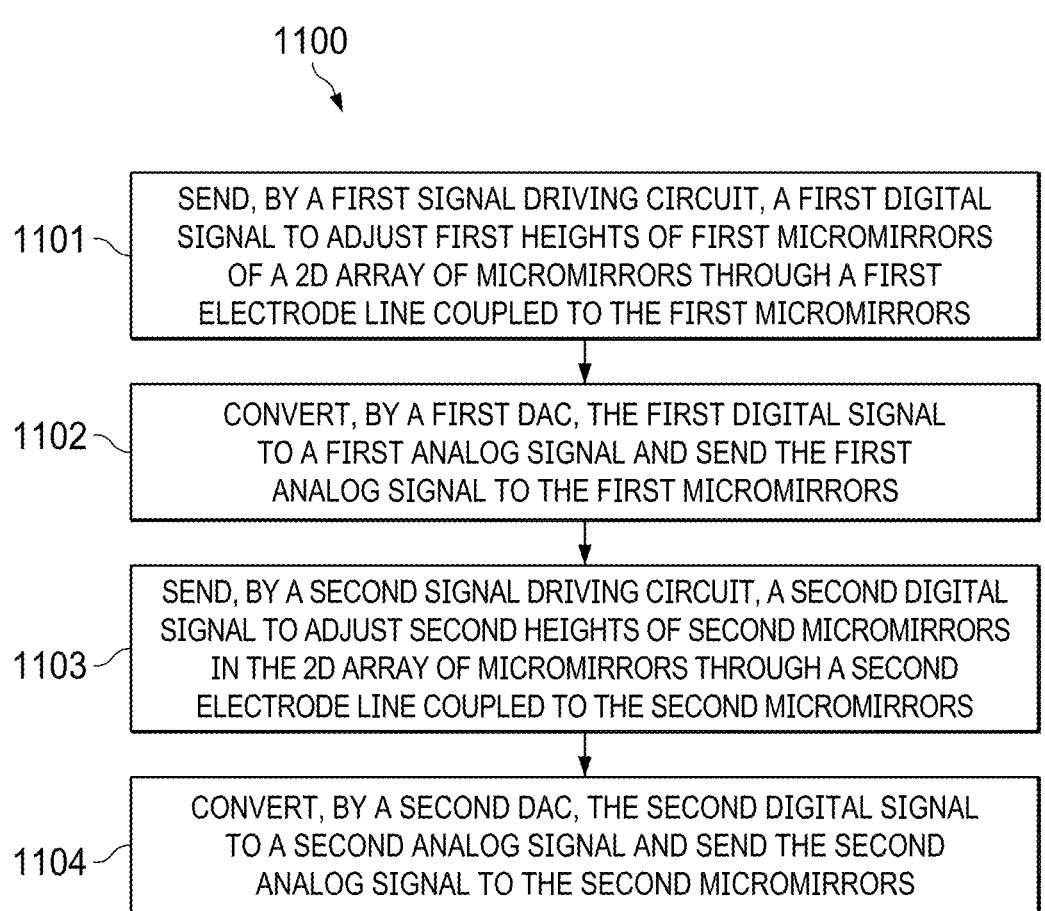

1101 — SEND, BY A FIRST SIGNAL DRIVING CIRCUIT, A FIRST DIGITAL SIGNAL TO ADJUST FIRST HEIGHTS OF FIRST MICROMIRRORS OF A 2D ARRAY OF MICROMIRRORS THROUGH A FIRST ELECTRODE LINE COUPLED TO THE FIRST MICROMIRRORS

1102 — CONVERT, BY A FIRST DAC, THE FIRST DIGITAL SIGNAL TO A FIRST ANALOG SIGNAL AND SEND THE FIRST ANALOG SIGNAL TO THE FIRST MICROMIRRORS

1103 — SEND, BY A SECOND SIGNAL DRIVING CIRCUIT, A SECOND DIGITAL SIGNAL TO ADJUST SECOND HEIGHTS OF SECOND MICROMIRRORS IN THE 2D ARRAY OF MICROMIRRORS THROUGH A SECOND ELECTRODE LINE COUPLED TO THE SECOND MICROMIRRORS

1104 — CONVERT, BY A SECOND DAC, THE SECOND DIGITAL SIGNAL TO A SECOND ANALOG SIGNAL AND SEND THE SECOND ANALOG SIGNAL TO THE SECOND MICROMIRRORS

FIG. 12

1D CONTROL OF A PHASE LIGHT MODULATOR

BACKGROUND

Laser scanning is the controlled deflection of laser beams from a laser source, which can belong to the visible spectrum or other spectrum of light. Laser scanning systems are useful in various technologies, such as for lighting and sensor systems for automotive vehicles, laser imaging, detection, and ranging (LIDAR) systems, three-dimensional (3D) printers, laser printers, machines for material processing, laser engraving machines, medical laser systems, confocal microscopy, laser entertainment shows, and barcode scanners. Laser scanning systems include moveable optical components, such as mirrors, with varying angles to steer the laser beam. To control the scanning motion for steering the laser beam, laser scanning systems include mechanical components for changing the deflection angle of the laser beam, and electronic circuits for driving the mechanical components with suitable electric current. Laser scanning systems also include software for controlling the scanning motion.

SUMMARY

In accordance with at least one example of the disclosure, an apparatus includes micromirrors in rows and columns of a two-dimensional (2D) array, electrode lines coupled to the micromirrors, where the electrode lines are coupled to respective sets of the micromirrors, and signal driving circuits coupled to the electrode lines, the signal driving circuits configured to control the respective sets of the micromirrors via the electrode lines.

In accordance with at least one example of the disclosure, a device includes first micromirrors in first rows and first columns of a first 2D array, second micromirrors in second rows and second columns of a second 2D array, electrode lines coupled to respective sets of the first micromirrors, signal driving circuits coupled to the electrode lines and configured to control the respective sets of the first micromirrors via the electrode lines, and a mirror optically coupled to the first micromirrors and the second micromirrors.

In accordance with at least one example of the disclosure, a laser scanning system includes a laser source configured to emit a laser beam, and a laser scanning device configured to steer the laser beam from the laser source by deflecting the laser beam from a surface of the laser scanning device in a range of deflection angles. The laser scanning device includes a phase light modulator (PLM) including micromirrors in rows and columns of a 2D array on a surface of the PLM, and electrode lines coupled to respective sets of the micromirrors. The laser scanning device further includes signal driving circuits coupled to the electrode lines and configured to adjust heights of the micromirrors by a control signal via the electrode lines, where adjusting the heights of the micromirrors causes the steering of the laser beam.

BRIEF DESCRIPTION OF THE DRAWINGS

For a detailed description of various examples, reference will now be made to the accompanying drawings.

FIG. 12 is a flow diagram of a method for laser scanning, in accordance with various examples.

DETAILED DESCRIPTION

Figure 1:
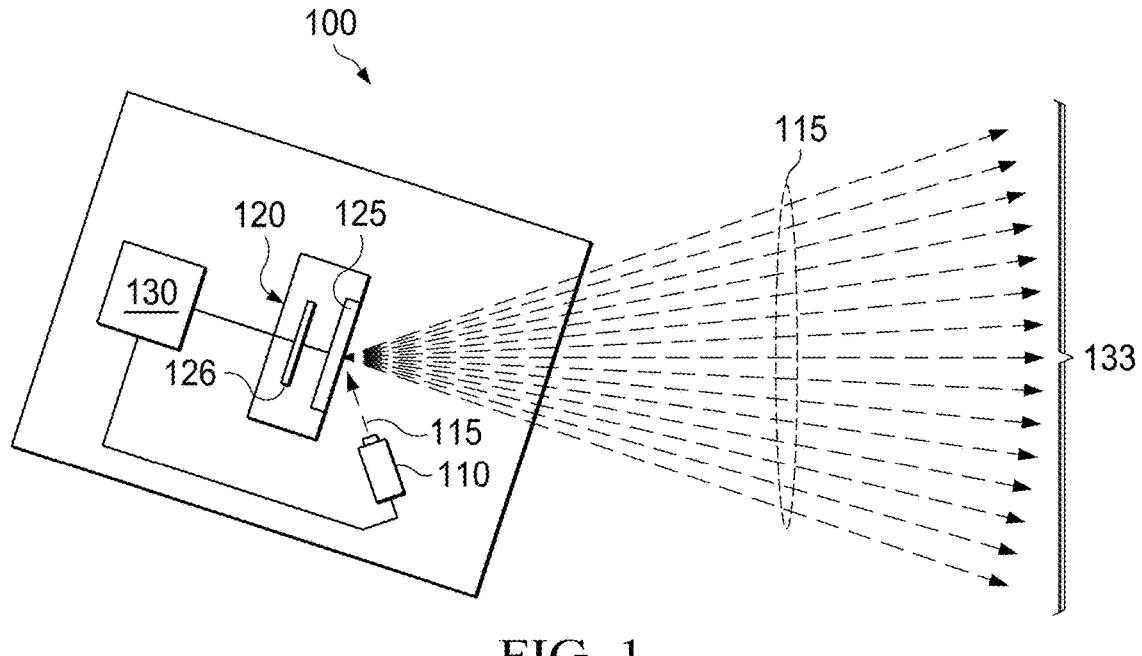
FIG. 1 is a block diagram of a laser scanning system, in accordance with various examples.

A laser scanning system may include a PLM configured to steer a laser beam that is emitted from a laser source onto the surface of the PLM. A PLM may include a micro-electro-mechanical system (MEMS) device such as micromirrors that have adjustable heights with respect to the surface of the PLM. The heights of the micromirrors can be adjusted by applying appropriate voltages. The micromirrors may be controlled, such as in groups, with different voltages to form a deflection angle on the PLM to reflect the laser beam from the laser source. The voltages may be applied according to a programmed phase ramp signal. The phase ramp signal may cause the micromirrors to provide a phase ramp on the surface of the PLM for deflecting the laser beam at a certain angle. The phase ramp on the surface may be formed by adjusting the heights of the micromirrors according to the phase ramp signal. The micromirrors of the PLM may be further controlled by changing the phase ramp signal, and accordingly the voltages applied to the micromirrors, to modify the heights of the micromirrors which changes the phase ramp and accordingly the angle for deflecting the laser beam with respect to the surface of the PLM. Varying the deflection angle in time causes the steering of the reflected light beam in a direction aligned according to the orientation of the phase ramp.

The micromirrors may be arranged in a 2D array of pixels on the surface of the PLM and may be electrically coupled to respective signal driving circuits through electrode lines. For example, the signal driving circuits may be complementary metal-oxide-semiconductor (CMOS) circuits or other suitable technology circuits. The signal driving circuits provide the voltages to adjust the heights of the micromirrors. A micromirror may be electrically coupled to a signal driving circuit. The steering rate of the laser beam is dependent on the data rate capacity of the laser scanning system to load the phase ramp signal from the signal driving circuits to the micromirrors. The steering rate of the laser beam, which is limited by the data rate capacity of the laser scanning system, may be slow or restrictive for some laser scanning applications, such as for automotive vehicles or LIDAR systems.

This description includes various examples of a laser scanning system with PLM based modulation to steer a laser beam from a laser source. The micromirrors of the PLM may be grouped into rows or columns, electrically coupled to one signal driving circuit through a respective electrode line. The signal driving circuit may adjust the heights of the micromirrors in the row or column to approximately the same height according to the same signal. Similarly, the heights of row or column of micromirrors in the 2D array of micromirrors may be adjusted by a respective signal driving circuit through a respective electrode line. As such, the number of signal driving circuits for controlling the micromirrors is reduced from a total number of signal driving circuits that matches the number of micromirrors in the PLM to one signal driving circuit per one row or column of micromirrors. Reducing the number of signal driving circuits may reduce the data load rate of the laser scanning system for changing the phase ramp signal at the signal driving circuits to the micromirrors, and accordingly may increase the steering rate of the laser beam. The signal driving circuits may include digital circuits and digital to analog converter (DACs) coupled to respective electrode lines. The phase ramp signal may be converted by the DACs at the signal driving circuits from a digital signal of the digital circuits to an analog signal to provide increased steps in height adjustment of the micromirrors. The increased steps in height adjustment may provide increased resolution or steps in the deflection angle for steering the laser beam.

The digital circuits may also be moved to the ends of the electrode lines outside the area of the 2D array of micromirrors, which allows for reducing the space between the electrode lines and the size of PLM pixels that include the micromirrors. The reduced space between the electrode lines may increase the range of the deflection angles of the PLM. The reduced pixel size may be useful for supporting lower voltage limits to operate the signal driving circuits. Reducing the voltage limit for actuation may also increase the range of displacement of the micromirrors which may be useful for longer light wavelength applications, such as in the near-infrared spectrum. Providing analog signals to adjust the heights of the micromirrors may increase height control of the micromirrors in terms of speed and displacement accuracy which may be useful to reduce the settling time of the micromirrors.

FIG. 1 is a block diagram of a laser scanning system 100, in accordance with various examples. The laser scanning system 100 may be useful for scanning a target, such as a surface or an object, by a laser beam to determine characteristics of the target or project a pattern onto the target. For example, the laser scanning system 100 may be a lighting and sensor system for an automotive vehicle, a LIDAR system, a medical laser system, an imaging laser system, a laser printer, or a laser scanner.

The laser scanning system 100 includes a laser source 110 configured to emit a laser beam 115 onto a laser scanning apparatus 120 including a PLM 125 and signal driving circuits 126. The laser scanning system 100 also includes a controller 130 coupled to the laser source 110 and the laser scanning apparatus 120. The controller 130 may be configured to control the operations of the laser source 110 and the laser scanning apparatus 120. For example, the controller 130 may include one or more processors and memory components including storing executable instructions to program the controller 130 to steer the laser beam 115 for scanning the target. The laser source 110 may be controlled by the controller 130 to switch on and off the laser beam 115. The laser beam 115 is incident on a 2D array of micromirrors (not shown) on the surface of the PLM 125. The signal driving circuits 126 of the laser scanning apparatus 120 may be controlled by the controller 130 to steer the laser beam 115. The laser beam 115 may be steered by the signal driving circuits 126 of the laser scanning apparatus 120 by adjusting the heights of the micromirrors to vary the deflection angle of the PLM 125. The deflection angle may be changed in time to steer the reflected laser beam 115 across a scanning range 133. The laser beam 115 may be steered in a single plane according to a range of deflection angles, which provides one-dimensional (1D) scanning of the laser beam 115 in a direction across the scanning range 133. The laser scanning system 100 may include other optical components (not shown), such as one or more lenses or mirrors, for aligning and projecting the laser beam 115 onto and away from the PLM 125. The laser scanning system 100 may also include a processing system (not shown) for controlling the 2D array of micromirrors on the PLM 125 and the deflection angle for steering the reflected laser beam 115.

Figure 2:
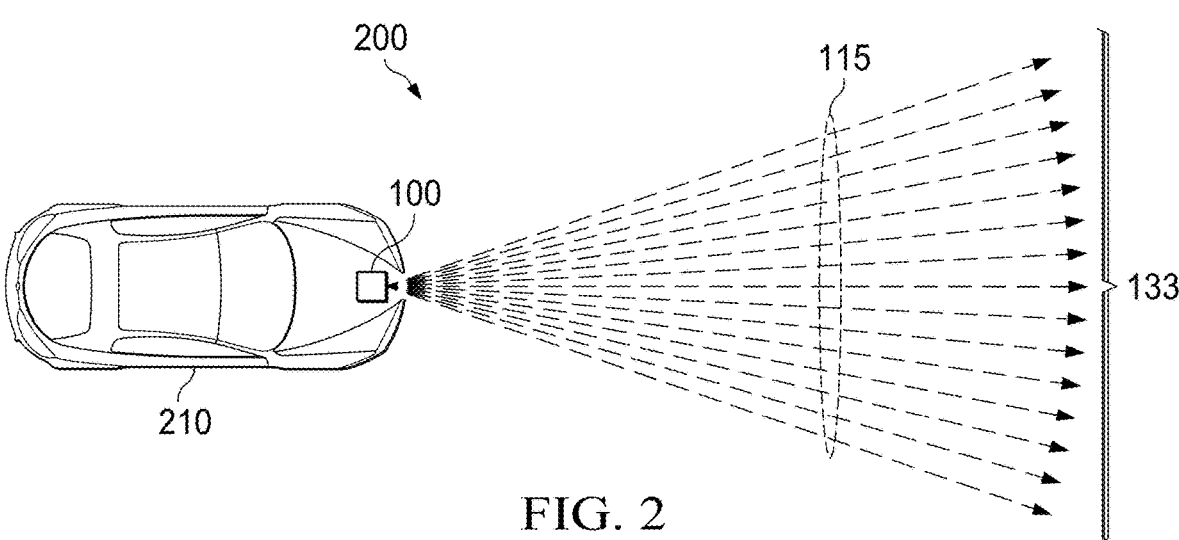
FIG. 2 is a block diagram of a LIDAR system of an automotive vehicle including the laser scanning system of FIG. 1, in accordance with various examples.

FIG. 2 is a block diagram of a LIDAR system 200 of an automotive vehicle 210, in accordance with various examples. The automotive vehicle 210 may include the laser scanning system 100 which may be a LIDAR device for providing the automotive vehicle 210 with laser scanning capability. The laser scanning system 100 may be positioned at the front of the vehicle 200 to provide laser scanning capability of the forward terrain at a certain distance in front of the automotive vehicle 210. The forward terrain may be scanned by steering the laser beam 115 across the scanning range 133 in front of the automotive vehicle 210. The light reflected from the scanned objects exposed to the laser beam 115 may be detected by the laser scanning system 100 or a detection system (not shown) on the automotive vehicle 210 to display images or determine characteristics of the scanned objects. In other examples, the laser scanning system 100 may be positioned at the back or the side of the automotive vehicle 210 to provide laser scanning capability in a corresponding direction.

Figure 3:
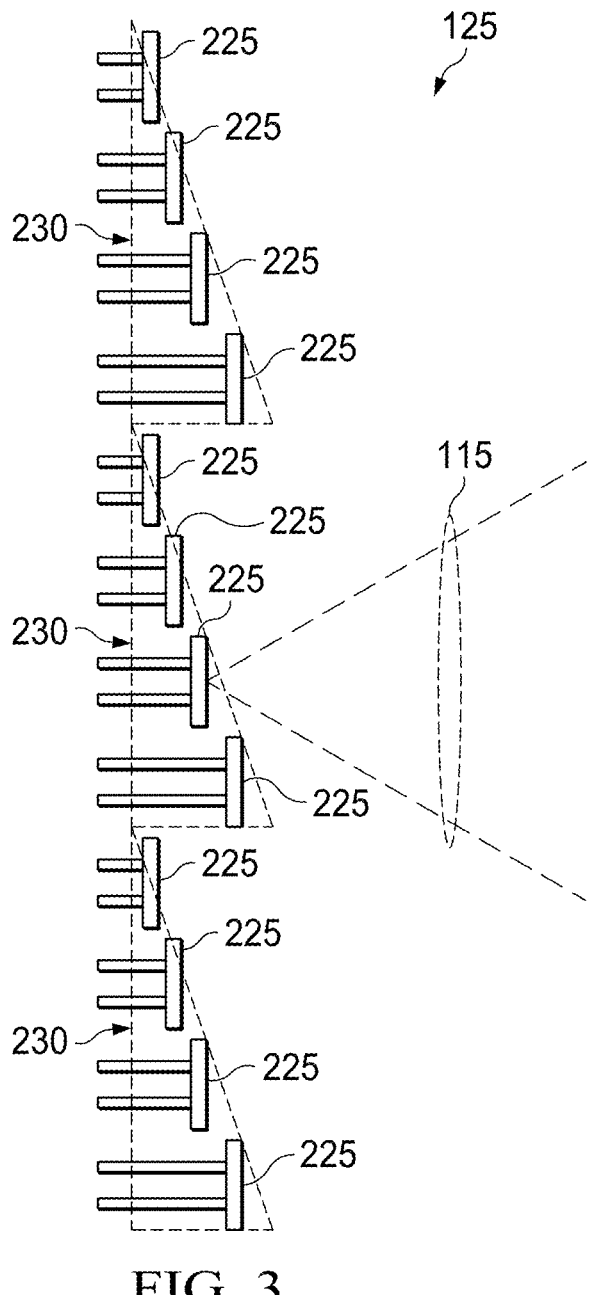
FIG. 3 is a block diagram showing a section view of micromirrors with adjustable heights on a PLM of the laser scanning system of FIG. 1, in accordance with various examples.

FIG. 3 is a block diagram showing a section view of an array of micromirrors 225 of the PLM 125, in accordance with various examples. The PLM 125 may include individual micromirrors 225 of adjustable respective heights. The micromirrors 225 are arranged in rows and columns providing a 2D array of micromirrors 225 on the surface of the PLM 125. For example, the heights of the micromirrors 225 may be adjusted, by the signal driving circuits 126, to form a phase ramp 230 for deflecting the laser beam 115 at a certain angle. The deflection angle of the laser beam 115 may be related to the slope angle of the phase ramp 230. The phase ramp 230 may be repeated across a row or column of micromirrors 225, such as to provide a Kinoform or Fresnel reflection surface for deflecting the angle of the laser beam 115.

Figure 4:
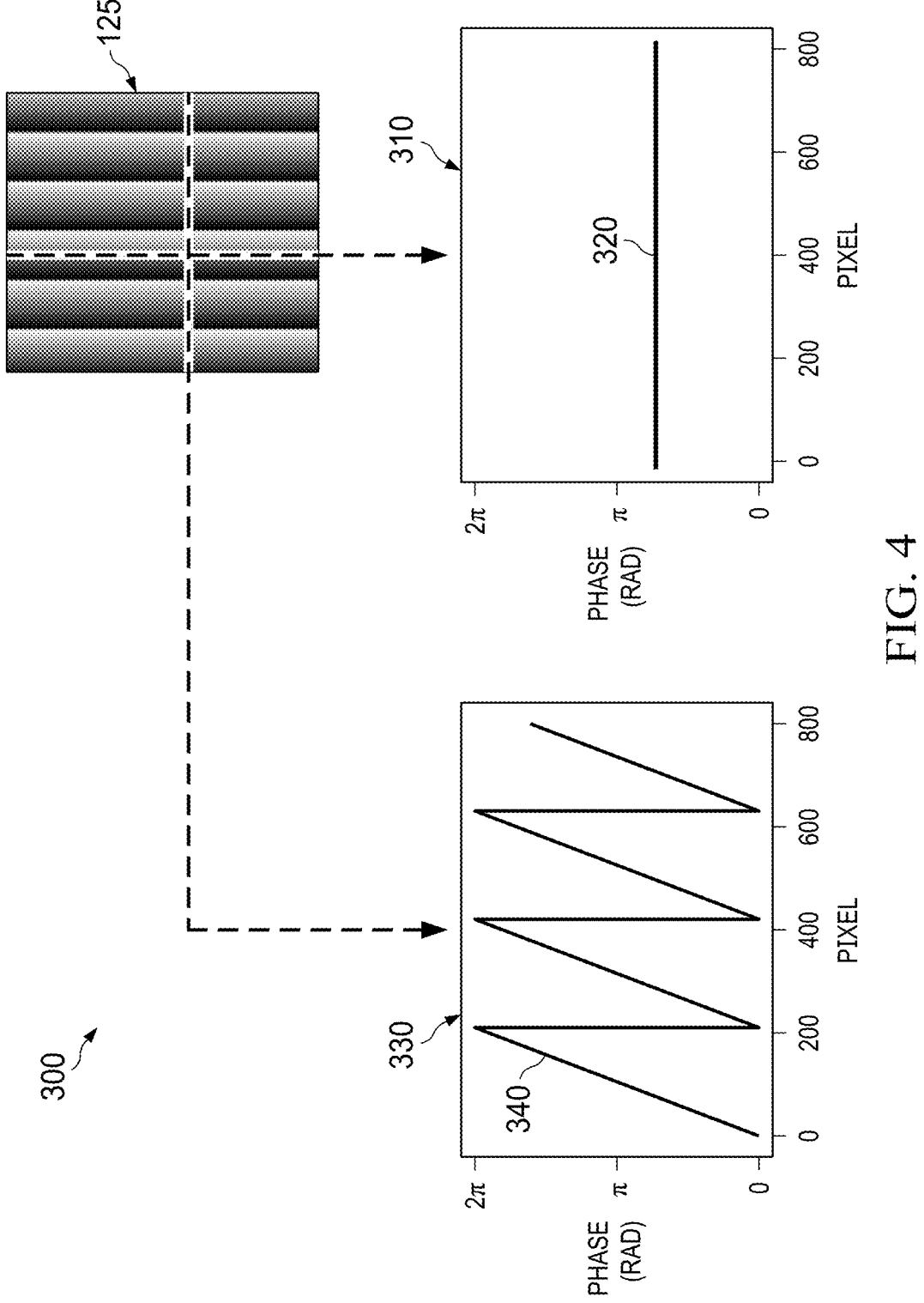
FIG. 4 shows a control signal for adjusting the heights of the micromirrors of FIG. 2, in accordance with various examples.

FIG. 4 shows a control signal 300 for adjusting the heights of the micromirrors 225 (not shown) on the surface of the PLM 125, in accordance with various examples. The control signal 300 may have two signal components in two orthogonal directions across the surface of the PLM 125. The two signal components may be for controlling the rows and columns, respectively, of the 2D array of micromirrors 225.

To reduce the number of signals and signal driving circuits 126 of the laser scanning apparatus 120, each column of micromirrors 225 may be controlled by a respective uniform phase signal 310 that adjusts the heights of the micromirrors 225 in the same column to approximately the same height. FIG. 4 shows a top view of the surface of the PLM 125 where the micromirrors 225 have approximately the same heights in the columns of the 2D array. A graph of the uniform phase signal 310 is shown, in which the x-axis represents a range of positions of the pixels across a column of micromirrors 225, and the y-axis represents the phase values for the voltages allocated to adjust the heights of the micromirrors 225 in the column. The phase value may provide the height displacement of the micromirrors at the pixels. A pixel across the column of micromirrors 225 may include a single micromirror 225. In other examples, a pixel may include more than a single micromirror 225. The uniform phase signal 310 is represented by a first curve 320 of equal phase values across the range of pixels, which drives the micromirrors 225 across the respective column at approximately the same height.

To provide the repeated phase ramp 230 across a row of the micromirrors 225, as shown in the top view of the surface of the PLM 125, a phase ramp signal 330 may be repeated to adjust the heights of the micromirrors 225 accordingly in the respective row. A graph of the repeated phase ramp signal 330 is shown, in which the x-axis represents a range of pixels across a row of micromirrors 225, and the y-axis represents the phase values for the voltages or currents allocated to adjust the heights of the micromirrors 225 in the row. The repeated phase ramp signal 330 is represented by a second curve 340 having repeated variations in the phase values across the range of pixels. The repeated variations in the phase values adjusts the heights of the micromirrors 225 across the respective row by repeating steps to form the phase ramp 230 according to a certain deflection angle of the laser beam 115.

In other examples, the phase ramp signal 330 may be repeated to adjust the heights of the micromirrors 225 in a column and provide the phase ramp 230 across the column of the micromirrors 225. In this case, each row of micromirrors 225 may be controlled by a respective uniform phase signal 310 to provide approximately the same for the micromirrors 225 in the same row.

Figure 5:
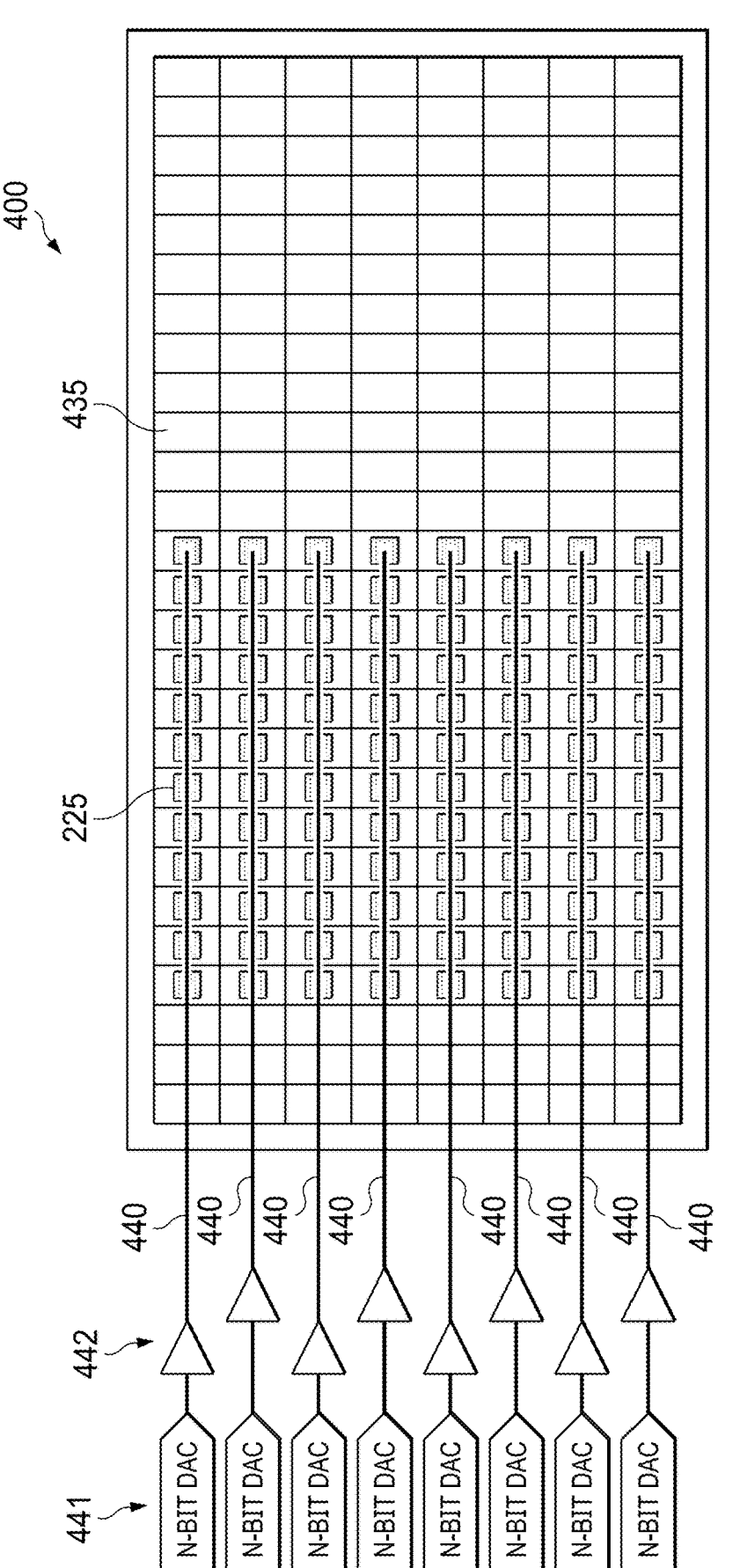
FIG. 5 is a block diagram showing a top view of a laser scanning device of the laser scanning system of FIG. 1, in accordance with various examples.

FIG. 5 is a block diagram showing a top view of a laser scanning device 400, in accordance with various examples. For example, the laser scanning device 400 may be part of the laser scanning apparatus 120 and includes the PLM 125 and the signal driving circuits 126. The laser scanning device 400 may include pixels 435 arranged in a 2D array. A pixel 435 may include a micromirror 225 on the surface of the PLM 125. The row of pixels 435 may be electrically coupled to respective electrode lines 440 for applying a control signal 300. For example, the control signal 300 may be a phase ramp 230, a repeated phase ramp 230, or a uniform phase signal 310.

The control signal 300 may be a digital signal that is converted to an analog signal to provide a voltage or current level for adjusting the height of the micromirrors 225 in the respective row of pixels 435. For example, a 4-bit digital signal may provide 16 steps or height levels for a micromirror 225, or an 8-bit digital signal may provide 256 steps or height levels for the micromirror 225. The number of steps or height levels may be increased by increasing the number of bits per digital signal. The laser scanning device 400 may include DACs 441 with respective signal amplifiers 442 that are coupled to the electrode lines 440. For example, the signal driving circuits 126 of the laser scanning apparatus 120 may include digital circuits (not shown) and respective DACs 441. A DAC 441 may be configured to convert a portion of the control signal 300 from an N-bit digital signal provided by a digital circuit coupled to the DAC 441 into an analog signal, where N is an integer. The DAC 441 may provide the analog signal to a respective row of pixels. The portion of the control signal adjusts the height of the micromirrors 225 in the respective row of pixels to approximately the same height. The combination of the DACs 441 may adjust the heights of the micromirrors in the different rows to match the phase values of the control signal 300. For example, the combination of the DACs 441 may adjust the heights of the micromirrors in different rows, across any column, to provide the repeated phase ramp 230 according to the phase ramp signal 330.

Figure 6:
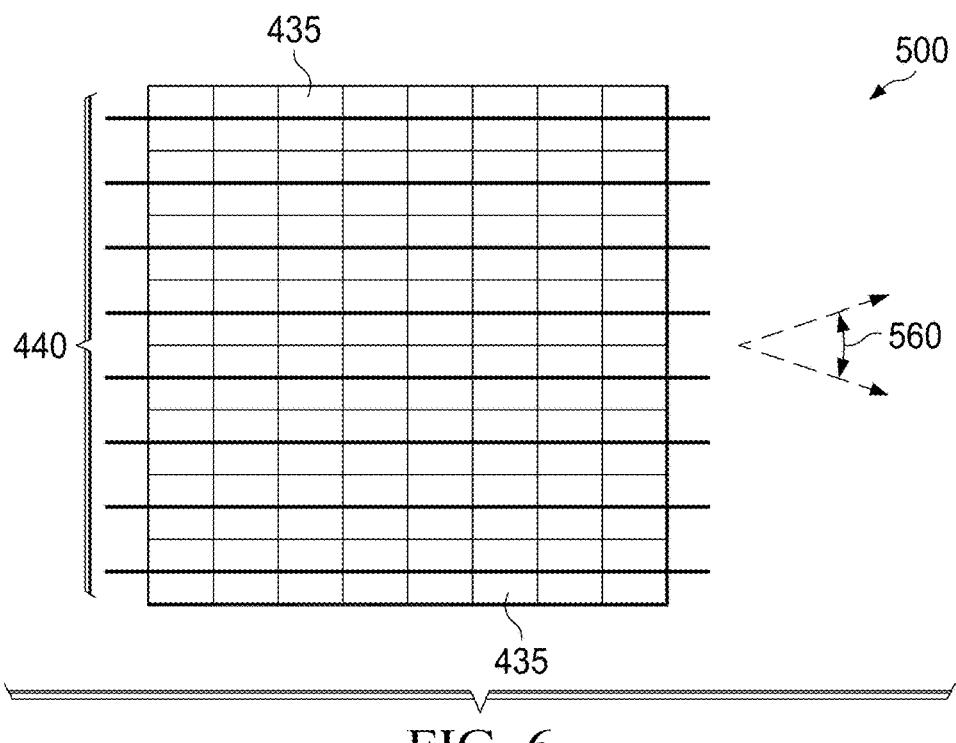
FIG. 6 is a block diagram of electrode lines of a laser scanning device of the laser scanning system of FIG. 1, in accordance with various examples.

FIG. 6 is a block diagram of a design 500 of the pixels 435 of the laser scanning device 400, in accordance with various examples. The pixels 435 include the micromirrors 225 (not shown) which are electrically coupled to the electrode lines 440. The electrode lines 440 may be parallel and may be equally spaced in a direction along the rows or columns of the micromirrors 225 on the pixels 435. An electrode line 440 may be electrically coupled to one row or column of the micromirrors 225. The space between the electrode lines 440 may be restricted by the size of the signal driving circuits 126 coupled to the electrode lines 440 under the PLM 125. Accordingly, the pixels 435 and the micromirrors 225 may be rectangular or square shaped and have side widths according to the space occupied by the signal driving circuits 126. The space between the electrode lines 440 may provide a field of view (FOV) 560, in a direction according to the orientation of the electrode lines 440, providing a range of deflection angles to the laser beam 115. To increase the FOV 560 of the laser scanning device 400, the space density of the electrode lines 440 can be increased.

Figure 7:
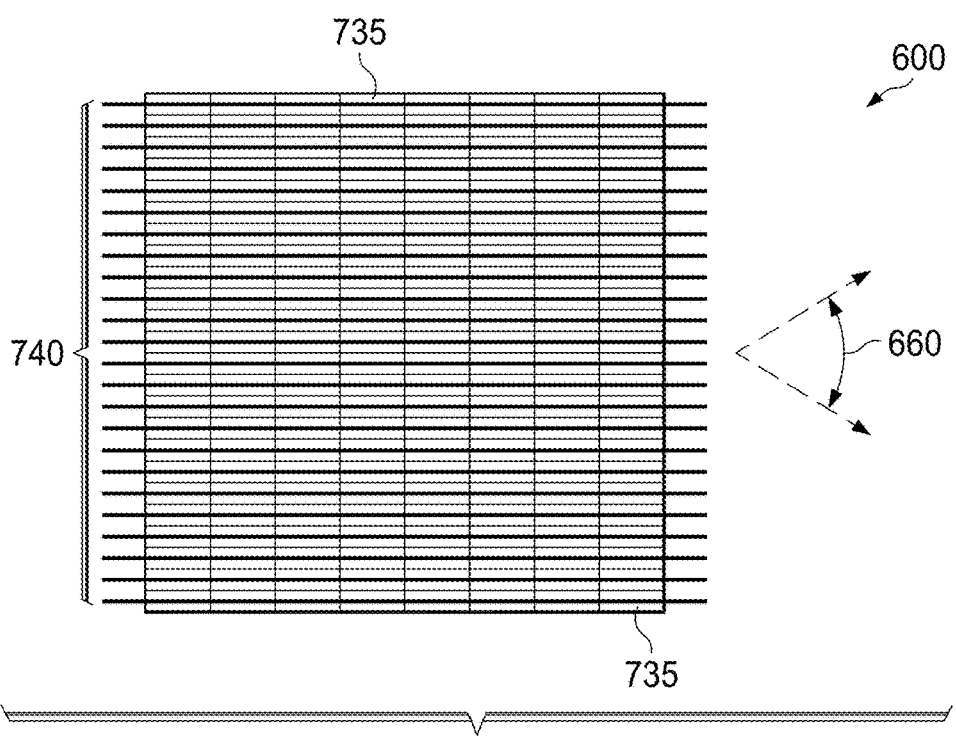
FIG. 7 is a block diagram of electrode lines of a laser scanning device of the laser scanning system of FIG. 1, in accordance with various examples.

FIG. 7 is a block diagram of a design 600 of pixels 735 in the laser scanning device 400, in accordance with various examples. According to the design 600, laser scanning device 400 may include a 2D array of the pixels 735 instead of the pixel 435. The pixels 735 may include the micromirrors 225 on the surface of the PLM 125. The row of pixels 735 may be electrically coupled to respective electrode lines 740. The pixels 735 may provide a FOV 660 that is increased in comparison to the FOV 560 of the design 500. The FOV 660 may be provided according to a higher space density of electrode lines 740 in comparison to the electrode lines 440 of the design 500. The space between the electrode lines 740 in the design 600 may be reduced, in comparison to the space between the electrode lines 440 in the design 500, by placing the signal driving circuits 126 outside the area of the pixels 735 and the micromirrors 225. For example, the first DACs 441 and respective signal amplifiers 442 of the signal driving circuits 126 (not shown) may be coupled to the ends of the electrode lines 740 outside the area of the pixels 735. Accordingly, the space between electrode lines 740 may no longer be restricted by the size of the components of the signal driving circuits 126. For example, the space of the electrode lines 740 in the design 600 may be reduced relative to the electrode lines 440 in the design 500, and may be comparable to the size of the micromirrors 225. Accordingly, the FOV 660 may be increased in comparison to the FOV 560.

Figure 8:
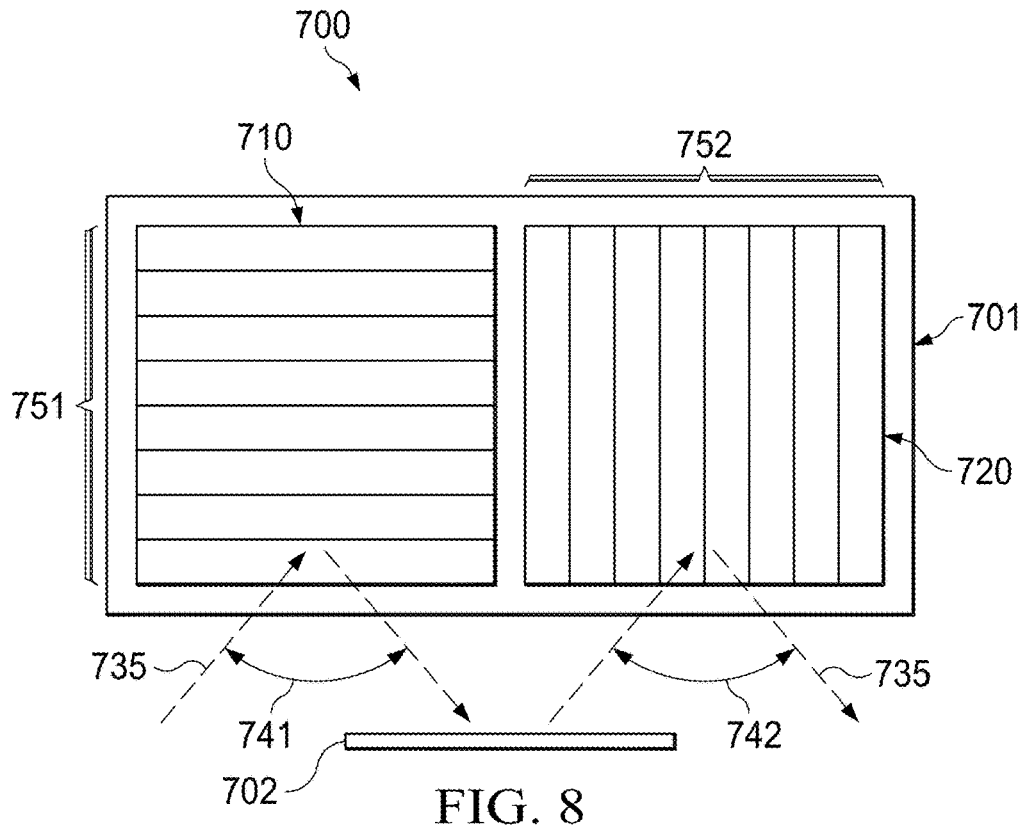
FIG. 8 is a block diagram of a 2D laser scanning system, in accordance with various examples.

FIG. 8 is a block diagram of a 2D laser scanning system 700, in accordance with various examples. The 2D laser scanning system 700 includes a laser scanning device 701 and a mirror 702 facing the laser scanning device 701. The laser scanning device 701 may include a first mirror array 710 and a second mirror array 720 on the surface of the laser scanning device 701. The first mirror array 710 and second mirror array 720 may be separate PLM devices (e.g., with separate packaging) or may be two regions of the same PLM device where the first mirror array 710 may be illuminated first by an incident laser beam 735. The second mirror array 720 may then be illuminated by the incident laser beam 735 after reflecting the incident laser beam 735 by the mirror 702. The first mirror array 710 and second mirror array 720 may steer the incident laser beam 735 from a laser source (not shown) with the mirror 702. The mirror 702 may be facing the first mirror array 710 and the second mirror array 720 to reflect the laser beam 735, which is deflected at a first angle 741 by the first mirror array 710 onto the second mirror array 720. The second mirror array 720 may deflect the laser beam 735 from the mirror 702 at a second angle 742. The laser beam 735 may be deflected at the first angle 741 and then at the second angle 742 on different planes, which may provide the 2D laser scanning of the laser beam 735.

The first mirror array 710 may include a first 2D array of first micromirrors (not shown) with adjustable heights for controlling the first angle 741 of deflection of the laser beam 735 from the laser source onto the mirror 702. The second mirror array 720 may include a second 2D array of second micromirrors (not shown) with adjustable heights for controlling the second angle 742 of deflection of the laser beam 735 from the mirror 702. The laser beam 735 may be steered by the first mirror array 710 by adjusting the heights of the first micromirrors to vary the first angle 741, and by the second mirror array 720 by adjusting the heights of the second micromirrors to vary the second angle 742. The first angle 741, second angle 742, or both may be changed in time to steer the reflected laser beam 735 in multiple planes to provide the 2D laser scanning of the laser beam 735.

The first mirror array 710 may include first electrode lines 751 that are in parallel and equally spaced in a first direction, such as along the rows of the first micromirrors of the first mirror array 710. Each row of the first micromirrors may be electrically coupled to a first electrode line 751 to adjust the first micromirrors in the row jointly for the same height. The second mirror array 720 may include second electrode lines 752 that are in parallel and equally spaced in a second direction, such as along the columns of the second micromirrors of the second mirror array 720. Each column of the second micromirrors may be electrically coupled to a second electrode line 752 to adjust the second micromirrors in the column jointly for the same height. The first direction of the first electrode lines 751 and the second direction of the second electrode lines 752 may be orthogonal. Accordingly, the laser beam 735 may be steered in a first plane according to a range of the first angle 741, which provides 1D scanning of the laser beam 735 in a first direction. For example, the laser beam 735 may be steered by the first mirror array 710 in a vertical direction with respect to the horizontal direction of the first electrode lines 751 and the rows of the first micromirrors. The laser beam 735 may also be steered in a second plane orthogonal to the first plane according to a range of the second angle 742, which provides 1D scanning of the laser beam 735 in a second direction orthogonal to the first direction. For example, the laser beam 735 may be steered by the second mirror array 720 in a horizontal direction with respect to the vertical direction of the second electrode lines 752 and the columns of the second micromirrors. Steering the laser beam 735 by both the first mirror array 710 and second mirror array 720 may provide the 2D scanning of the laser beam 735.

The laser scanning system 700 may include other optical components (not shown), such as one or more lenses or mirrors, for aligning and projecting the laser beam 735 onto and away from the first mirror array 710 and second mirror array 720. The laser scanning system 700 may also include a processing system (not shown) for controlling the first micromirrors of the first mirror array 710 and the second micromirrors of the second mirror array 720 to change the first angle 741 and second angle 742, respectively, for deflecting and steering the laser beam 735.

Figure 9:
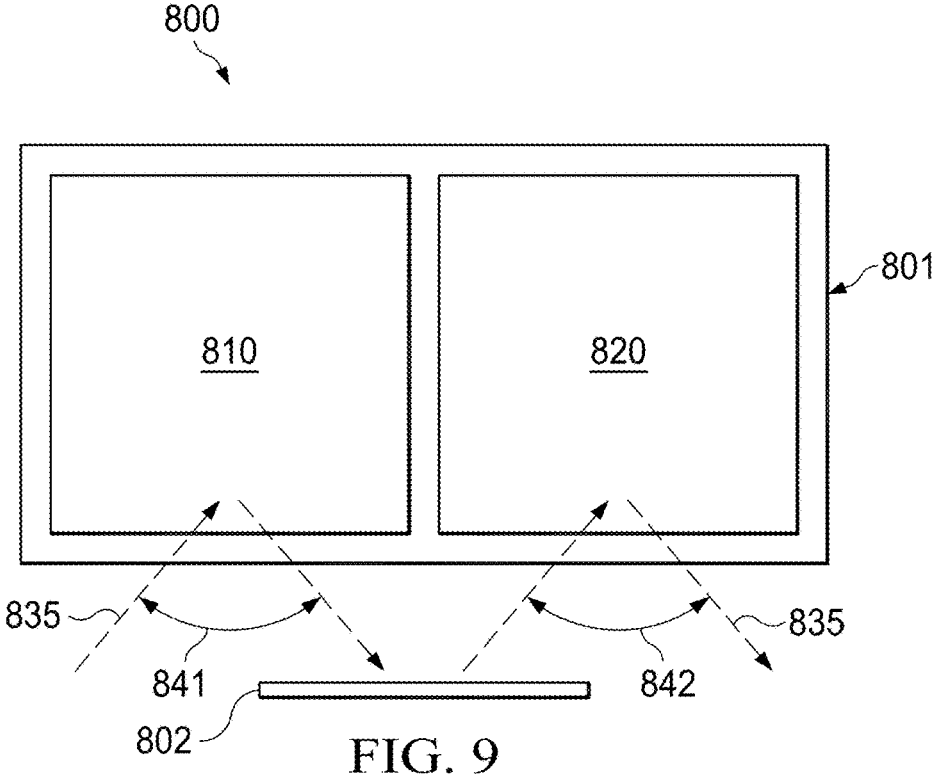
FIG. 9 is a block diagram of a 2D laser scanning system, in accordance with various examples.

FIG. 9 is a block diagram of a 2D laser scanning system 800, in accordance with various examples. The 2D laser scanning system 800 includes a laser scanning device 801 and a mirror 802 facing the laser scanning device 801. The laser scanning device 801 may include a first PLM 810 and a second PLM 820 on the surface of the laser scanning device 801. The first PLM 810 and second PLM 820 may steer an incident laser beam 835 from a laser source (not shown) with the mirror 802. The mirror 802 may be facing the first PLM 810 and the second PLM 820 to reflect the laser beam 835 that is deflected, at a first angle 841, by the first PLM 810 onto the second PLM 820. The second PLM 820 may deflect the laser beam 835 from the mirror 802 at a second angle 842.

The first PLM 810 may include a first 2D array of first micromirrors (not shown) with adjustable heights for controlling the first angle 841 of deflection of the laser beam 835 from the laser source onto the mirror 702. The second PLM 820 may include a second 2D array of second micromirrors (not shown) with adjustable heights for controlling the second angle 842 of deflection of the laser beam 835 from the mirror 802. The laser beam 835 may be steered by the first PLM 810 by adjusting the heights of the first micromirrors to vary the first angle 841, and by the second PLM 820 by adjusting the heights of the second micromirrors to vary the second angle 842. The first angle 841, second angle 842, or both may be changed in time to steer the reflected laser beam 835 in multiple planes to provide the 2D scanning of the laser beam 835.

The first PLM 810 may be configured to provide 2D scanning of the laser beam 835 onto the mirror 802. The first micromirrors of the PLM 810 may be controlled by signal driving circuits through a grid of first electrode lines (not shown). The signal driving circuits adjust the heights of the first micromirrors to steer the laser beam 835 in multiple planes and provide 2D laser scanning. A first micromirror may be electrically coupled to a pair of orthogonal first electrode lines on the grid and may be individually controlled from the other first micromirrors of the first PLM 810. Controlling the height of the first micromirror individually and independently from the other micromirrors allows for the 2D steering of the incident laser beam 835. The second PLM 820 may include second electrode lines (not shown) that are in parallel and equally spaced, such as along the rows or columns of the second micromirrors of the second PLM 820. A row or column of the second micromirrors may be electrically coupled to a second electrode line to adjust the second micromirrors in the same row or column jointly for the same height. Accordingly, the laser beam 835 may be steered by the second PLM 820 in a single plane according to a range of the second angle 842, which provides 1D scanning for the laser beam 835. Because the second micromirrors of the second PLM 820 may be jointly controlled per row or column by the same signal driving circuit, the number of signal driving circuits and therefore the data load rate may be reduced in comparison to the first PLM 810. Accordingly, the second PLM 820 may have a higher steering rate for the laser beam 835 than the first PLM 810, and steering the laser beam 835 by both the first PLM 810 and second PLM 820 may provide 2D scanning of the laser beam 835 with an increased steering range at a higher steering rate than the first PLM 810.

The laser scanning system 800 may include other optical components (not shown), such as one or more lenses or mirrors, for aligning and projecting the laser beam 835 onto and away from the first PLM 810 and second PLM 820. The laser scanning system 800 may also include a processing system (not shown) for controlling the first micromirrors of the first PLM 810 and the second micromirrors of the second PLM 820 to change the first angle 841 and second angle 842, respectively, for deflecting and steering the laser beam 835.

Figure 10:
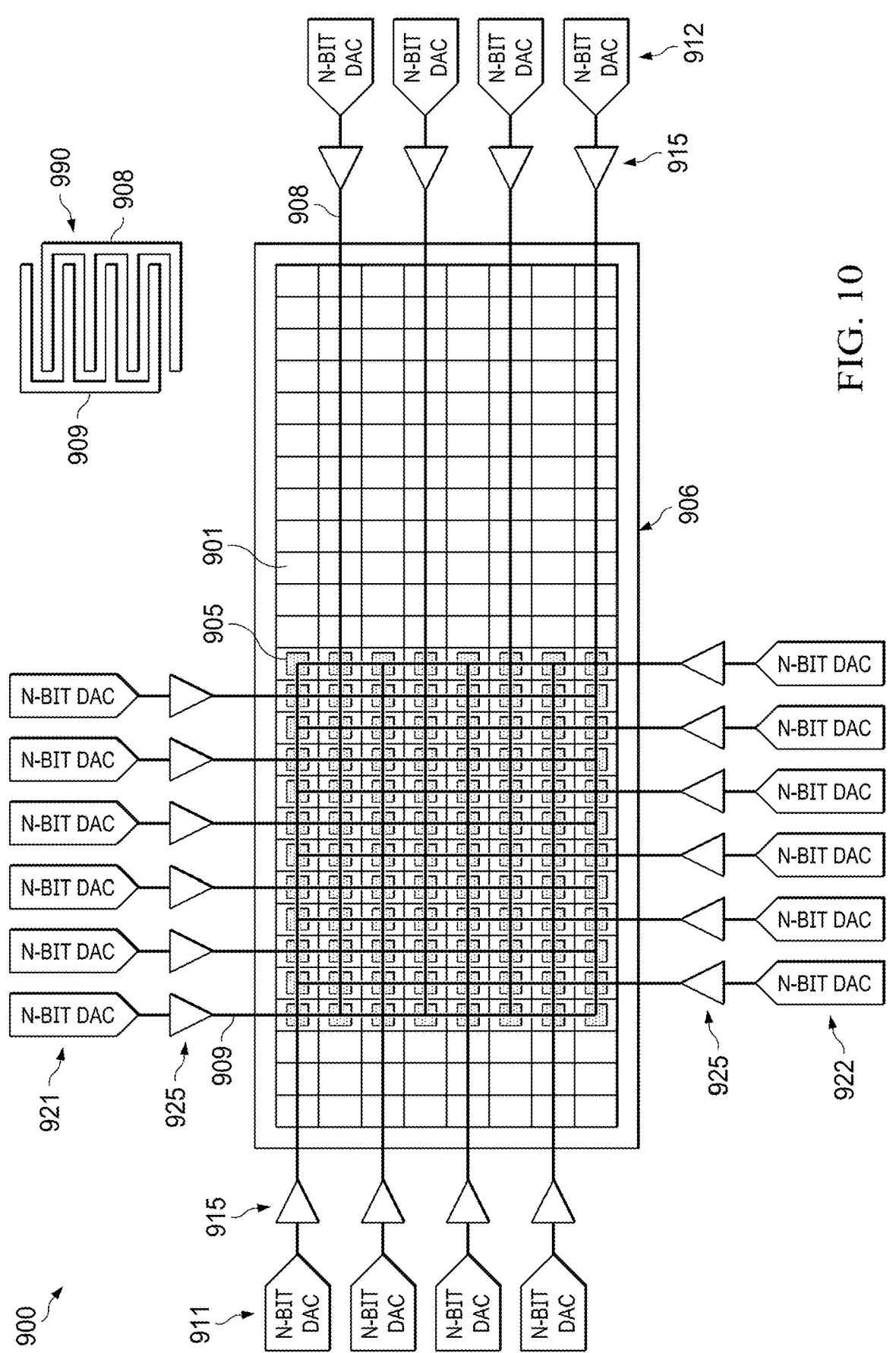
FIG. 10 is a block diagram of a laser scanning device for 2D laser scanning, in accordance with various examples.

FIG. 10 is a block diagram of a laser scanning device 900 for 2D laser scanning, in accordance with various examples. The laser scanning device 900 may include pixels 901 arranged in a 2D array. A pixel 901 may include a micromirror 905 on the surface of a PLM 906. A row of pixels 901 may be electrically coupled to a respective first electrode line 908 for applying a control signal. A column of pixels 901 may also be electrically coupled to a respective second electrode line 909 for applying a respective control signal. The first electrode lines 908 coupled to the rows of the pixels 901 may not be in contact with, and accordingly may be electrically isolated from, the second electrode lines 909 coupled to the columns of the pixels 901. For example, the first electrode line 908 and the second electrode line 909 may be arranged in a comb structure 990 also shown in FIG. 10. The comb structure 990 may be used to connect a first electrode line 908 and a second electrode line 909 to a micromirror 905 in a pixel 901, where each of the first and second electrode lines 908 and 909 may be split into multiple lines (e.g., four lines as shown in FIG. 10) that are connected in a comb arrangement to the micromirror 905 without being in contact with one another.

The control signal may be a digital signal that is converted to an analog signal to determine a voltage or current level for adjusting the height of the micromirrors 905 in the respective row or column of pixels 901. For example, a 4-bit digital signal may provide 16 steps or height levels per micromirror 905, or an 8-bit digital signal may provide 256 steps or height levels per micromirror 905.

The laser scanning device 900 may include first DACs 911 and second DACs 912 with respective signal amplifiers 915 that are coupled to the first electrode lines 908. The first DAC 911 and second DAC 912 may be configured to convert the control signal from an N-bit digital signal into an analog signal to a respective row of pixels 901, where N is an integer. The first DACs 911 may be coupled to a respective first subset of the first electrode lines 908 on a first end of the first electrode lines 908. The second DACs 912 may be coupled to a respective second subset of the first electrode lines 908 on a second end of the first electrode lines 908 opposite to the first end.

The laser scanning device 900 may also include third DACs 921 and fourth DACs 922 with respective signal amplifiers 925 that are coupled to the second electrode lines 909. The third DAC 921 and fourth DAC 922 may be configured to convert the control signal from an N-bit digital signal into an analog signal to a respective column of pixels 901. The third DACs 921 may be coupled to a respective first subset of the second electrode lines 909 on a first end of the second electrode lines 909. The second DACs 912 may be coupled to a respective second subset of the second electrode lines 909 on a second end of the second electrode lines 909 opposite to the first end.

Placing the first and second DACs 911 and 912 on opposite ends of the first electrode lines 908, such as in an alternating manner as shown in FIG. 10, may be useful to reduce the distance between the first electrode lines 908. Similarly, placing the third and fourth DACs 921 and 922 on opposite ends of the second electrode lines 909 may be useful to reduce the distance between the second electrode lines 909. Reducing the distance between the first electrode lines 908 and between the second electrode lines 909 may increase a FOV for 2D laser scanning and facilitate distributing and connecting the first DACs 911 and second DACs 912 to the first the first electrode line 908 and the third DACs 921 and fourth DACs 922 to the second electrode lines 909.

Figure 11:
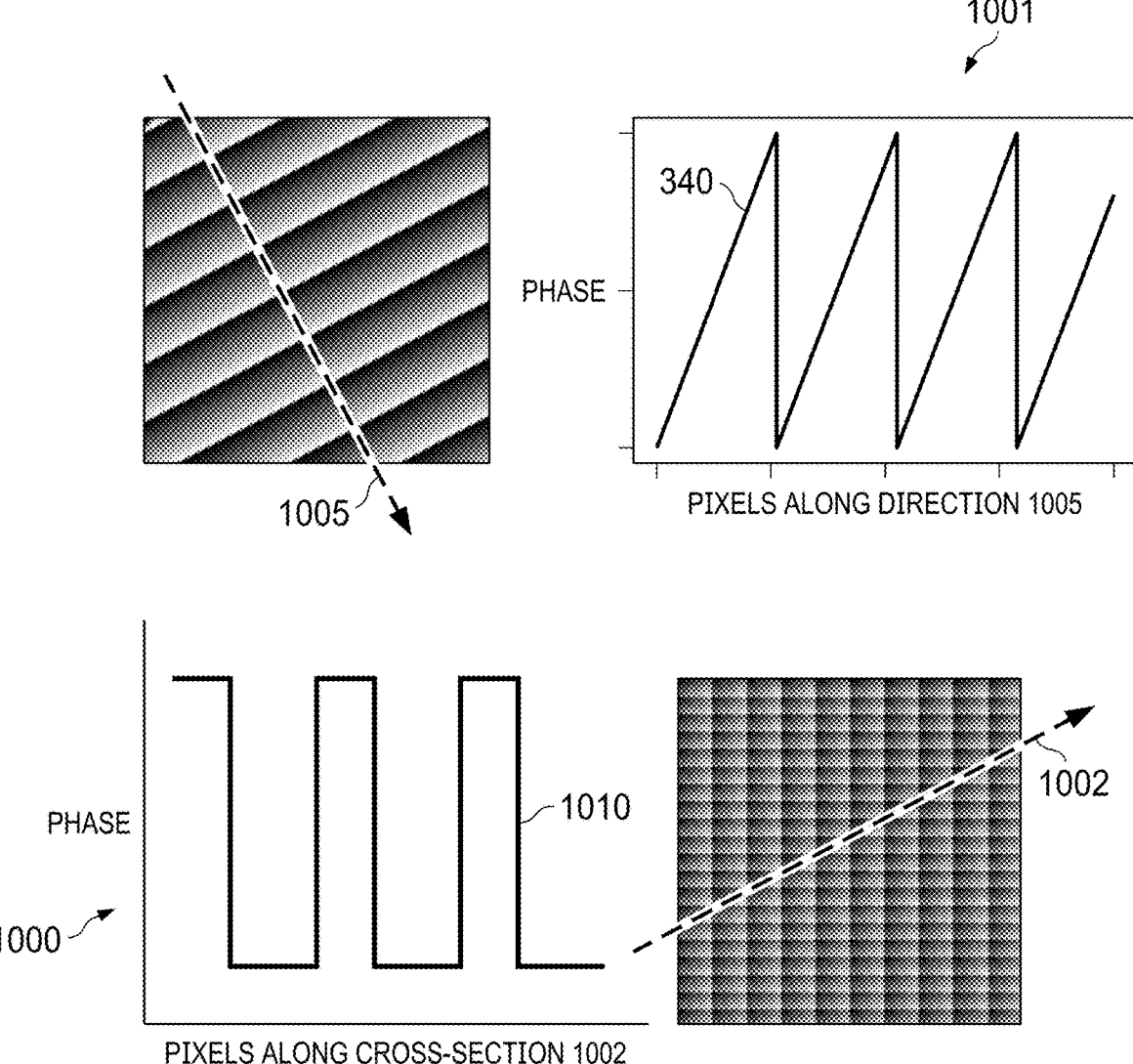
FIG. 11 shows a phase profile on the surface of the laser scanning device of FIG. 9, in accordance with various examples.

FIG. 11 shows a surface phase profile 1000 provided on the surface of the laser scanning device 900, in accordance with various examples. The surface phase profile 1000 may be provided by adjusting the heights of the micromirrors 905 on the surface of the laser scanning device 900. FIG. 11 also shows a top view of the surface of the laser scanning device 900. The surface phase profile 1000, which is represented by a curve 1010, includes repeated high and low constant phase levels across the surface of the laser scanning device 900 in the direction of a cross-section 1002 on the surface of the laser scanning device 900. For example, the difference between the high and low phase levels may be equal to one wavelength of light of the incident laser beam on the laser scanning device 900.

To provide the surface phase profile 1000, the heights of the micromirrors 905 may be adjusted to have respective high and low heights in the direction of the cross-section 1002. The heights may be adjusted by applying a repeated phase ramp signal 1001 along the rows and columns of the micromirrors 905 in the direction 1005 orthogonal to the cross-section 1002. For example, the repeated phase ramp signal 1001 may be represented by a signal curve similar to the second curve 340 having repeated variations in the phase values across the micromirrors 905. The repeated phase ramp signal 1001 may be applied in the direction 1005 by applying a first component signal of the phase ramp signal 1001 on the first electrode lines 908 along the rows of the micromirrors 905 and a second component signal of the phase ramp signal 1001 on the second electrode lines 909 along the columns of the micromirrors 905. Each component signal may also be represented by a signal curve similar to the second curve 340. Accordingly, the heights of the micromirrors 905 may be adjusted by the combined displacement provided by both the first component signal and the second component signal of the phase ramp signal 1001.

FIG. 12 is a flow diagram of a method 1100 for laser scanning, in accordance with various examples. For example, the method 1100 may be performed by the laser scanning system 100 or other laser scanning devices or systems, as described above. At step 1101, a first signal driving circuit may send a first digital signal to adjust first heights of first micromirrors of a 2D array of micromirrors through a first electrode line coupled to the first micromirrors. The first heights may be adjusted to a first height level according to a phase ramp signal. The phase ramp signal may provide a first phase ramp on the 2D array of micromirrors to deflect a laser beam by a first angle. The first micromirrors may be in a first row or first column of the 2D array of micromirrors. The first row or first column may be coupled to the first electrode line. At step 1102, a first DAC of the first digital signal may convert the first digital signal to a first analog signal and send the first analog signal to the first micromirrors. The first analog signal may be a first phase value of the phase ramp signal.

At step 1103, a second signal driving circuit may send a second digital signal to adjust second heights of second micromirrors in the 2D array of micromirrors through a second electrode line coupled to the second micromirrors. The second heights may be adjusted to a second height level according to the phase ramp signal. The second micromirrors may be arranged in parallel to the first micromirrors in the 2D array, such as in a second row or second column of the 2D array of micromirrors. The second row or second column may be coupled to the first electrode line. At step 1104, a second DAC of the second digital signal may convert the second digital signal to a second analog signal and send the second analog signal to the second micromirrors. The second analog signal may be a second phase value of the phase ramp signal.

For example, a first DAC 441 of the laser scanning device 400 may send a first analog value of the phase ramp signal 330 to a first row of pixels 435 that includes first micromirrors on the surface of the PLM 125. A second DAC 441 may send a second analog value of the phase ramp signal 330 to a second row of pixels 435 that includes second micromirrors. Similarly, the remaining DACs 441 may send remaining values of the phase ramp signal 330 to the remaining rows of pixels 435 including micromirrors of the PLM 125. As such, the combination of the DACs 441 may adjust the heights of the micromirrors in the different rows to match the phase values of the phase ramp signal 330.

The combination of the DACs 441 may subsequently change the heights of the micromirrors in the different rows to match new phase values of a second phase ramp signal. The second phase ramp signal may provide a second phase ramp on the 2D array of micromirrors to deflect the laser beam by a second angle. The heights of the micromirrors in the different rows may be further adjusted by the DACs 441 according to new phase values of new phase ramp signals to continue changing phase ramp on the 2D array of micromirrors. Accordingly, the laser beam may be deflected in a range of angles to steer the laser beam in a single plane or multiple planes.

The term "couple" appears throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described system or device. While certain components may be described herein as being of a particular process technology, these components may be exchanged for components of other process technologies. Systems and devices described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. An apparatus, comprising:
   micromirrors in rows and columns of a two-dimensional (2D) array;
   electrode lines coupled to the micromirrors; and
   signal driving circuits coupled to the electrode lines, wherein respective signal driving circuits are configurable to provide respective first signals to control respective first sets of the micromirrors via the electrode lines and wherein each respective first signal causes all micromirrors within each respective first set of the micromirrors to be in the same position, the signal driving circuits further configurable to provide respective second signals to second sets of the micromirrors via the electrode lines and wherein each respective second signal causes positions of micromirrors within each respective second set of micromirrors to vary according to a pattern of the respective second signal.

2. The apparatus of claim 1, wherein the respective first sets of the micromirrors are the rows or the columns of the micromirrors.

3. The apparatus of claim 1, wherein the micromirrors are phase light modulator (PLM) micromirrors having heights adjustable by the signal driving circuits.

4. The apparatus of claim 1, wherein the signal driving circuits comprise:
   digital-to-analog converters (DACs); and
   signal amplifiers, wherein the DACs are coupled through the signal amplifiers to the rows of the micromirrors.

5. The apparatus of claim 4, wherein the signal driving circuits include digital signal circuits coupled to the DACs, and wherein the DACs are configurable to convert digital signals from the digital signal circuits to analog signals on the electrode lines.

6. The apparatus of claim 5, wherein the digital signal circuits are 4-bit digital signal circuits or 8-bit digital signal circuits.

7. The apparatus of claim 1, wherein the electrode lines are first electrode lines, wherein the respective sets of the micromirrors are the rows of the micromirrors, and wherein the apparatus further comprises second electrode lines coupled to the micromirrors, wherein the second electrode lines are coupled to the columns of the micromirrors.

8. The apparatus of claim 7, wherein the first electrode lines are spaced by a first distance, and wherein the second electrode lines are spaced by a second distance that is different than the first distance.

9. The apparatus of claim 7, wherein the signal driving circuits are first signal driving circuits, wherein the apparatus further comprises second signal driving circuits coupled to the second electrode lines, and wherein the second signal driving circuits are configurable to control the micromirrors in columns of the micromirrors via the second electrode lines.

10. The apparatus of claim 9, wherein the first signal driving circuits are configurable to provide a first component signal of a phase ramp signal and the second signal driving circuits are configurable to provide a second component signal of the phase ramp signal, and wherein the first and second component signals provide a combined displacement of heights of the micromirrors in the rows and the columns of the micromirrors.

11. The apparatus of claim 7, wherein the first electrode lines are electrically isolated from the second electrode lines.

12. The apparatus of claim 7, wherein the first electrode lines and the second electrode lines are coupled to the same micromirrors in respective comb structures.

13. The apparatus of claim 1, wherein first signal driving circuits of the signal driving circuits are coupled to first electrode lines of the electrode lines at a first end of the electrode lines, and wherein second signal driving circuits of the signal driving circuits are coupled to second electrode lines of the electrode lines at a second end of the electrode lines opposite to the first end.

14. A device, comprising:
first micromirrors in first rows and first columns of a first two-dimensional (2D) array;
second micromirrors in second rows and second columns of a second 2D array;
first electrode lines coupled to the first micromirrors, wherein the first electrode lines are coupled to respective sets of the first micromirrors extending in a first direction;
second electrode lines coupled to the second micromirrors, wherein the second electrode lines are coupled to respective sets of the second micromirrors extending a second direction different than the first direction;
signal driving circuits coupled to the first and second electrode lines, wherein the signal driving circuits are configurable to independently control the respective sets of the first micromirrors via the first electrode lines and to independently control the respective sets of the second micromirrors via the second electrode lines; and
a mirror configurable to optically couple the first micromirrors to the second micromirrors serially with respect to a light beam.

15. The device of claim 14, wherein the respective sets of the first micromirrors is one of the first rows of the first micromirrors or one of the first columns of the first micromirrors.

16. The device of claim 14, wherein the signal driving circuits include first signal driving circuits and second signal driving circuits, wherein:

the first signal driving circuits are respectively coupled to the first electrode lines; and
the second signal driving circuits are respectively coupled to the second electrode lines.

17. A laser scanning system, comprising:
a laser source configurable to emit a laser beam; and
a laser scanning device configurable to steer the laser beam from the laser source by deflecting the laser beam from a surface of the laser scanning device in a range of deflection angles, the laser scanning device comprising:
a phase light modulator (PLM) comprising:
micromirrors in rows and columns of a two-dimensional (2D) array on a surface of the PLM; and
electrode lines coupled to respective sets of the micromirrors; and
signal driving circuits coupled to the electrode lines and configurable to adjust heights of the micromirrors by a control signal via the electrode lines to position all micromirrors in a row of the rows of micromirrors to be at a same height and to vary heights of all micromirrors in a particular column of the columns of micromirrors according to a phase ramp signal of the control signal, wherein adjusting the heights of the micromirrors causes the steering of the laser beam.

18. The laser scanning system of claim 17, further comprising a controller coupled to the signal driving circuits and configurable to control the signal driving circuits to provide the control signal for adjusting the heights of the micromirrors.

19. The laser scanning system of claim 17, wherein the signal driving circuits comprise:
digital-to-analog converters (DACs) configurable to convert the control signal from a digital signal to an analog signal provided via the electrode lines to the respective sets of the micromirrors; and
signal amplifiers, wherein the DACs are coupled through the signal amplifiers to the electrode lines.

20. The laser scanning system of claim 17, wherein the laser scanning system is a laser imaging, detection, and ranging (LIDAR) system of an automotive vehicle, and wherein the laser scanning device and the laser source are part of a LIDAR device on the automotive vehicle.

* * * * *